A. CAMPBELL.
DOOR OPERATING MECHANISM FOR DUMP CARS.
APPLICATION FILED JUNE 12, 1914.
1,140,111.
Patented May 18, 1915
3 SHEETS—SHEET 1.
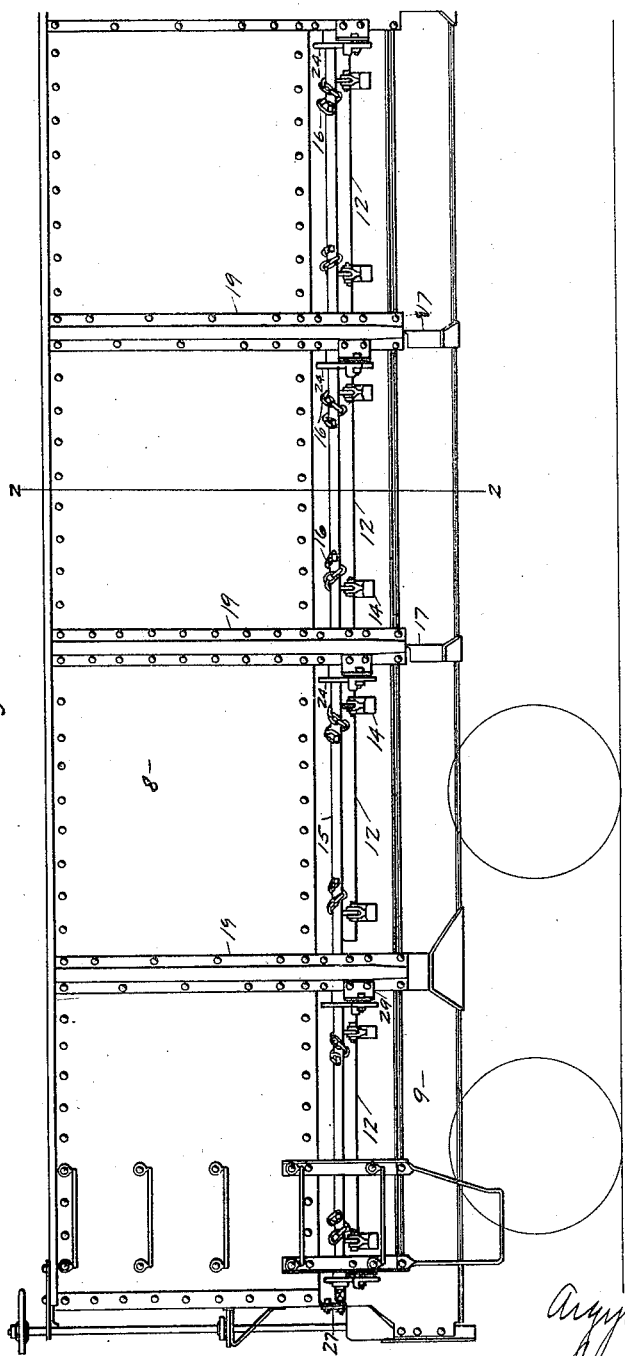
WITNESSES:
INVENTOR.
BY
ATTORNEY

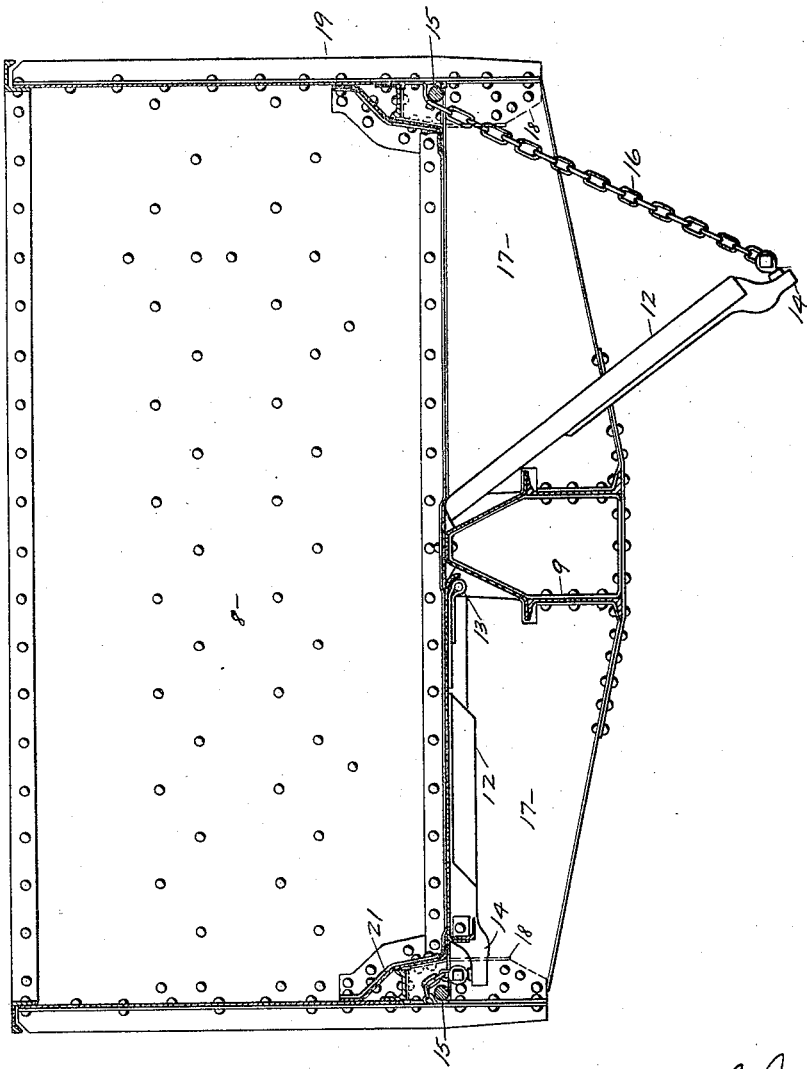

A. CAMPBELL.
DOOR OPERATING MECHANISM FOR DUMP CARS.
APPLICATION FILED JUNE 12, 1914.
1,140,111.
Patented May 18, 1915.
3 SHEETS—SHEET 3.
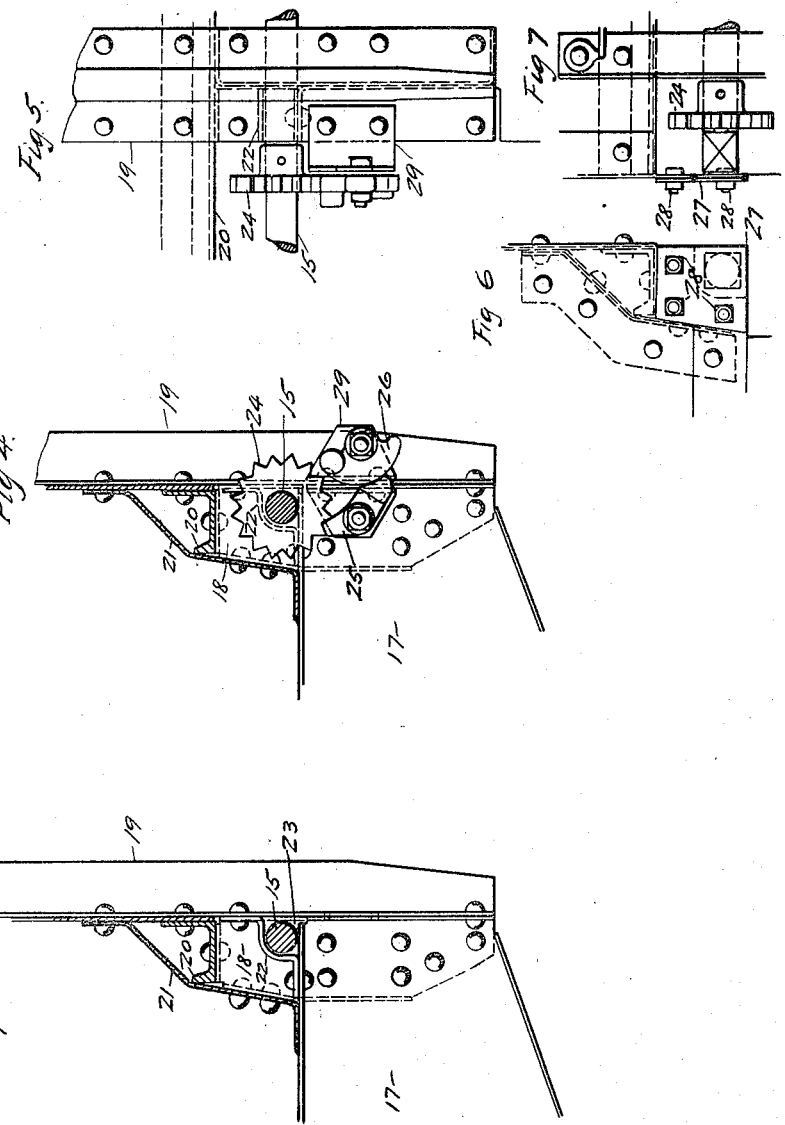
WITNESSES:
INVENTOR.
BY
ATTORNEY.

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS.

DOOR-OPERATING MECHANISM FOR DUMP-CARS.

1,140,111.  Specification of Letters Patent.  Patented May 18, 1915.

Application filed June 12, 1914. Serial No. 844,627.

*To all whom it may concern:*

Be it known that I, ARGYLE CAMPBELL, a citizen of the United States, residing at Chicago, in the county of Cook and State of Illinois, have invented a certain new and useful Improvement in Door-Operating Mechanism for Dump-Cars, of which the following is a full, clear, concise, and exact description, reference being had to the accompanying drawings, forming a part of this specification.

My invention relates to improvements in door operating mechanism for dump cars.

The object of my invention is, to provide a door operating mechanism for dump cars of cheap and simple construction and efficient operation.

In the drawings forming a part of this specification, I have illustrated my door operating mechanism as applied to a railroad car of the general service type, though it will be apparent that the features embodying my invention may be applied to, and used in connection with, hoppers of many varieties, or with any type of dump car.

In the drawings, Figure 1 represents a side elevation of approximately half a railroad dump car showing the door operating mechanism embodying my invention in position thereon. Fig. 2 is an enlarged cross section taken on line 2—2 of Fig. 1. Fig. 3 is an enlarged partial cross section illustrating a detail shown in Fig. 2. Fig. 4 is an enlarged partial cross section identical with Fig. 3, but showing in elevation thereon one of the ratchets mounted on the operating shaft, and the latch and dog associated therewith. Fig. 5 is a side elevation illustrating in detail one of the intermediate ratchets mounted on the operating shaft and the immediately adjacent parts. Fig. 6 is a detail showing in end view one of the limiting plates for the operating shaft. Fig. 7 is a detail illustrating one of the end ratchets on the operating shaft.

Referring to the drawings, the numeral 8 represents a railroad dump car body provided with a suitable underframe 9, and having at suitable intervals along either side the upright stakes 19—19. The car body is also provided with a series of downwardly opening doors 12—12, the said doors being hinged at their inner ends 13, and connected at their outer ends 14—14 to the operating shafts 15—15 on the corresponding side of the car by suitable flexible members, preferably the chains 16—16.

Inasmuch as the operating shafts and the parts of the car body associated therewith are substantially the same on each side of the car, we will describe herein following only one side.

In preferable construction, the doors 12 of the car equal in number the intervals between the stakes of the side of the car, and each door is provided with two flexible members 16—16 connecting it to an operating shaft 15. Each shaft 15 extends substantially from one end to the center of the car, and rests at the point of passage by each stake of the car upon a diaphragm 17. Each diaphragm 17 is connected to a filler plate 18 which forms the connection to the adjacent side stake 19 and bottom side angle 20 which is located beneath side hopper sheet 21. A preferably strap-like member 22, which for convenience hereinafter is denominated a "strap," is secured to the diaphragm 17 and the side stake 19. A longitudinal opening 23 is thus provided between the strap 22, the diaphragm 17 and the side stake 19. The operating shafts 15 pass through these openings and also the round holes in filler plates 18. This structure obviates the necessity of providing journal bearings for the operating shafts 15, the members surrounding the opening 23 providing bearings therefor. Each operating shaft 15 is provided with ratchets 24—24, each having a latch 25 therefor, and a dog 26 associated therewith, to secure the latch against accidental disengagement from the ratchet. At the end of the shafts there are provided limiting plates 27—27, which are appropriately secured to adjacent portions of the car body preferably by bolts 28—28, the said plates 27—27 being adapted to prevent longitudinal movement of the shafts 15—15. In preferable construction, each operating shaft 15 is provided intermediate its ends with a plurality of ratchets 24—24 there being preferably one for each side stake 19, the said ratchets each having associated therewith a latch 25 and a dog 26 therefor, the same being mounted upon a bracket 29 secured to the adjacent side stake 19. The ratchets intermediate the ends of the shaft may be employed to relieve the shaft from torsional strain exerted thereon by the flexible members connecting the dump doors to the operating shaft. The doors may be closed by suitably rotating the operating shaft from one of its ends, and upon closure of the doors the adjacent latch and dog placed in locking position, and thereupon the operator may place the latches in engagement with their respective ratchets intermediate the ends of the operating shafts. Thus when the car receives its load, the torsional strain upon the operating shaft instead of being from end to end of the rod, is relieved at the intervals measured by the distance from one intermediate ratchet to the other. Thus in the structure described a comparatively light operating shaft may be used; further, the shaft is not weakened by perforations therein for receiving cotters or pins to prevent its longitudinal movement; and also the shaft may be readily and economically mounted by reason of the absence of the usual journal bearings therefor, heretofore generally employed.

I claim:

1. In a dump car, the combination with a car body having doors therein, side stakes and diaphragms, operating shafts, flexible members connecting said shafts to said doors, said shafts resting on said diaphragms adjacent to said side stakes and straps connecting said diaphragm and said side stake for the purpose of holding in position said shafts.

2. In a dump car of the class described, the combination of drop doors, diaphragms attached to side stakes, operating shafts attached to the car doors by flexible connections, said shafts resting upon said diaphragms adjacent to said side stakes and being held in position by straps connected to said side stakes and diaphragms.

3. In a dump car, the combination with a car body having doors, side stakes, diaphragms, operating shafts and flexible members connecting the doors to the operating shafts, said operating shafts being at rest upon said diaphragms and adjacent to said side stakes and held in position by strap members attached to said diaphragms and side stakes.

4. In a dump car, the combination with a car body having doors therein, of an operating shaft and flexible members connecting the operating shaft to the door, side stakes, lateral members connected thereto, straps connected to the side stakes and lateral members, and surrounding the operating shaft.

5. In a dump car, the combination with a car body having doors, side stakes and diaphragms, of an operating shaft and flexible members connecting the doors to the operating shaft and members connecting the diaphragms to the side stakes, the operating shaft resting upon said diaphragms and passing through said connecting member.

6. In a dump car, the combination with a car body having doors, side stakes and diaphragms, of an operating shaft and flexible members connecting the doors to the operating shaft, members connecting the diaphragms to the side stakes, and straps joining said diaphragms to the side stakes, and forming therewith longitudinal openings for the passage of the operating shaft.

7. In a car of the character described, the combination with a car body having dumping doors and an operating shaft for said doors, of means for preventing longitudinal movement of said shaft, said means including a plate fixed to the car and extending over an end of said shaft.

8. In a car of the character described, the combination with a car body having dumping doors and an operating shaft for said doors, of means for preventing longitudinal movement of said shaft, said means comprising plates at each end of the shaft and extending over the ends thereof, said plates being detachably connected to the car.

9. In a dump car, a car body, doors mounted therein, an operating shaft longitudinally mounted in said body, and flexible means connecting the doors to said operating shaft, and means for limiting the longitudinal movement of said shaft, said means including a limiting plate removably secured to the car body at one end of the shaft.

10. In a dump car, a car body having doors and an operating shaft longitudinally mounted in said body, flexible members connecting the doors to the operating shaft, and ratchets, the said ratchets being mounted upon the shaft intermediate its ends, the car body being provided with means for engaging said ratchets to limit the torsional strain upon the operating shaft of said flexible members.

11. In a dump car, the combination with a car body having doors therein, an operating shaft longitudinally mounted in said body, flexible members connecting the doors to said shaft, limiting stops or plates abutting the end or ends of the operating shaft to prevent movement of said shaft in a longitudinal direction.

12. In a dump car, the combination with a car body having doors, operating shaft, flexible members connecting the doors and operating shaft, of a plurality of ratchets or stop members on said shaft for the purpose of reducing the torsional strain on said operating shaft and providing additional locking means for the shaft to further prevent rotation of the shaft when said car body is in movement or under load.

13. In a dump car, the combination with a car body having dumping doors, diaphragms and side stakes, of longitudinally arranged door operating shafts resting on said diaphragms at their outer ends and adjacent said side stakes, means for retaining said shafts in position, and a plurality of ratchet devices disposed along said shafts, some of which are located intermediate the ends thereof to thereby reduce the torsional action on said shafts and permit shafts of small size to be used.

ARGYLE CAMPBELL.

Witnesses:
CARRIE G. RANZ,
ARLINE R. ARNOLD.

Copies of this patent may be obtained for five cents each, by addressing the "Commissioner of Patents, Washington, D. C."